US005463685A

United States Patent [19]
Gaechter et al.

[11] Patent Number: 5,463,685
[45] Date of Patent: Oct. 31, 1995

[54] NETWORK BASED OUTBOUND CALL MANAGEMENT

[75] Inventors: Barbara I. Gaechter, Tinton Falls; Paramdeep S. Sahni, Marlboro; I. Grace Tseng, Middletown, all of N.J.

[73] Assignee: AT&T IPM Corp., Coral Gables, Fla.

[21] Appl. No.: 336,715

[22] Filed: Nov. 9, 1994

Related U.S. Application Data

[63] Continuation of Ser. No. 861,720, Apr. 1, 1992, abandoned.

[51] Int. Cl.$^6$ ............................. H04M 3/42; H04M 7/00; H04M 3/00; H04Q 3/64
[52] U.S. Cl. ............................. 379/207; 379/92; 379/216; 379/219; 379/265; 379/309
[58] Field of Search ............................. 379/67, 88, 89, 379/92, 201, 207, 216, 219, 265, 266, 309

[56] References Cited

U.S. PATENT DOCUMENTS

| | | | |
|---|---|---|---|
| 3,989,899 | 11/1976 | Norwich | 379/134 |
| 4,048,452 | 9/1977 | Gehring et al. | 379/113 |
| 4,436,962 | 3/1984 | Davis et al. | 379/211 |
| 4,436,963 | 3/1984 | Cottrell et al. | 379/211 |
| 4,451,705 | 5/1984 | Burke et al. | 379/211 |
| 4,476,349 | 10/1984 | Cottrell et al. | 379/214 |
| 4,559,416 | 12/1985 | Theis et al. | 379/34 |
| 4,592,048 | 5/1986 | Beckner et al. | 370/60 |
| 4,599,493 | 7/1986 | Cave | 379/247 |
| 4,653,085 | 3/1987 | Chan et al. | 379/94 |
| 4,656,624 | 4/1987 | Collins et al. | 370/60 |
| 4,712,230 | 12/1987 | Rice et al. | 379/112 |
| 4,734,931 | 3/1988 | Bourg et al. | 379/93 |
| 4,739,509 | 4/1988 | Bourg | 379/93 |
| 4,755,985 | 7/1988 | Jayapalan et al. | 370/58.1 |
| 4,757,529 | 7/1988 | Glapa et al. | 379/244 |
| 4,763,353 | 8/1988 | Canale et al. | 379/157 |
| 4,769,833 | 9/1988 | Farleigh et al. | 379/105 |
| 4,788,682 | 11/1988 | Vij et al. | 370/110.1 |

(List continued on next page.)

OTHER PUBLICATIONS

J. Dunogue et al., "The Building of Intelligent Networks", Sotelec, Paris, France, 2nd Quarter, 1989, pp. 5–22.
Heller, "Dialing Up Debtors," Inbound/Outbound Magazine Sep., 1989, pp. 22, 23, 25 and 26.

(List continued on next page.)

Primary Examiner—Jeffrey A. Hofsass
Assistant Examiner—Harry S. Hong
Attorney, Agent, or Firm—Eugene S. Indyk

[57] ABSTRACT

An outbound call management capability is provided for a public switched telephone network by a network based outbound call management (NOCM) complex, which can be accessed by all subscribers to the public switched network through one or more central offices in the network. A predetermined list of telephone numbers is stored in a data base in the NOCM complex for each subscriber who uses the NOCM services. The telephone numbers are automatically dialed at one or more predetermined scheduled times. When one of the dialed telephones is answered, the NOCM complex sets up a connection through the public switched telephone network between the called party and one or more attendants at one or more telephone numbers specified by a customer of the NOCM services. The NOCM services are made available to any subscriber of the public switched telephone network by provision of a special access code which permits a subscriber who is a customer of this service to dial the NOCM complex which will then interact with the customer by responding to voice or DTMF commands from the customer. The customer may program the list of telephone numbers to be called and program the telephone phone numbers to be used by the NOCM system to connect awaiting attendants with parties automatically called by the NOCM system. The NOCM system customer may set the time for the execution of his calling program by the NOCM system, and may interrupt or otherwise influence or change the execution of his program. All of this may be accomplished without a need to purchase expensive outbound call management premises equipment or to retain the services of a special provider of outbound call management services.

3 Claims, 6 Drawing Sheets

U.S. PATENT DOCUMENTS

| | | | |
|---|---|---|---|
| 4,876,717 | 10/1989 | Barron et al. | 379/88 X |
| 4,881,261 | 11/1989 | Oliphant et al. | 379/215 |
| 4,988,209 | 1/1991 | Davidson et al. | 370/58.2 |
| 5,023,868 | 7/1991 | Davidson et al. | 370/60 |
| 5,036,535 | 7/1991 | Gechter et al. | 379/210 |
| 5,062,103 | 10/1991 | Davidson et al. | 370/58.1 |
| 5,073,890 | 12/1991 | Danielsen | 370/58.2 |
| 5,193,110 | 3/1993 | Jones et al. | 379/201 X |

OTHER PUBLICATIONS

C. Strathmeyer, "Voice/Data Integration: An Applications Perspective," IEEE Communications Magazine, vol. 25, No. 12, Dec. 1987, pp. 30–35.

AT&T, "5ESS™ Switch ISDN Basic Rate Interface Specification 5E4 Generic Program," AT&T 5D5–900–301, 1985.

AT&T, "Call Management System (CMS)," PM–4495 F/Hg, 1978, brochure.

H. A. Lanty, et al., "The capabilities of No. 1 ESS make possible an Automatic Call Distribution service previously unequaled in features and flexibility," Bell Laboratories Record, Mar. 1978, pp. 77–82.

U.S. Ser. No. 07/291,813 Filed on Dec. 29, 1988 By Davidson et al.

DATABASE ~ 78

CUSTOMER INFO:
1. ACC. #, ADDRESS, TELEPHONE#, ADD'L CUST. INF.
2. DIALING PLAN (MUTIPLE LISTS, SCHEDULES)
3. AGENT CONTACT NUMBERS
4. ANALYSIS PROGRAM REQUEST
5. CALL MANAGEMENT OPTIONS

~ 80

ANALYSIS PROGRAMS:
1. CALL COMPLETION
2. CALL DURATION
3. CONVERSANT RESPONSE ANALYSIS

~ 82

SCHEDULE:
1. TIME OF DAY/DAY OF WEEK AVAILABILITY
2. CUSTOMER SELECTED RESERVATIONS

~ 84

CALL MANAGEMENT:
1. RETRY OPTION
2. DROP

FIG.3

```
            ┌──────────────────────────────────────┐ ~ 86
            │                                      │
            │     CUSTOMER SUBSCRIBES TO SERVICE   │
            │                                      │
            └──────────────────┬───────────────────┘
                               │
                               ▼
            ┌──────────────────────────────────────┐ ~ 88
            │                                      │
            │  OPERATOR INITIALIZES CUSTOMER IN DATABASE │
            │                                      │
            └──────────────────┬───────────────────┘
                               │
                               ▼
            ┌──────────────────────────────────────┐ ~ 90
            │   OPERATOR PROVIDES CUSTOMER COMPUTER│
            │   LOGIN/PASSWORD AND VOICE RESPONSE  │
            │            SYSTEM PASSWORD           │
            └──────────────────────────────────────┘
```

FIG. 4

```
                    ┌─ 92
CUSTOMER DIALS IN TO THE COMPUTER;
COMPUTER CHECKS FOR VALID LOGIN ID
    AND ASSOCIATED PASSWORD

┌─ 94
CUSTOMER INPUTS DIALING LIST/LISTS
& SCHEDULES (OR INPUTS CHANGES)

┌─ 96
CUSTOMER CONFIRMS THE INPUT

┌─ 97
COMPUTER SENDS THE CONFIRMATION
ACKNOWLEDGEMENT TO THE CUSTOMER
```

NETWORK BASED OUTBOUND CALL MANAGEMENT

This application is a continuation of application Ser. No. 07/861,720, filed on Apr. 1, 1992, now abandoned.

TECHNICAL FIELD

This invention relates to outbound call management. More particularly, this invention relates to outbound call management performed by a public switched telephone network.

BACKGROUND

Outbound call management equipment is used to accomplish a variety of commercially and socially significant activities. For example, this equipment is used to take surveys to determine customer satisfaction, to seek political opinions, and to do market research. They are also used to sell products and services and to effectuate fund raising activities and bill collection, among other things.

Traditional outbound call management equipment involves the automatic dialing of a predetermined list of telephone numbers and connection of called parties who answer the calls placed in accordance with the calling program to agents who then interact with those called parties. A telephone customer seeking such outbound call management services now only has two alternatives. He can purchase expensive outbound call management hardware and software and attach it to his own private telephone system or he can retain a special service bureau which has obtained this hardware and software and now makes the services available to others. Both of these service alternatives may be unsatisfactory for many telephone customers. The cost of the hardware and software needed to effectuate outbound call management is prohibitive for an individual or a small organization. These people are thus effectively precluded from obtaining outbound call management services through this route. They can seek the help of outbound call management service bureaus, but the resources of these bureaus are usually limited and inflexible so that access to the service is subject to schedule restrictions and there is no way to conveniently tailor the service to changing customer needs. Also, these service bureaus are extra middlemen who may add needless costs to the process.

Accordingly, many telecommunications network users have been effectively precluded or severely limited in their ability to obtain outbound call management services using existing equipment. Therefore, there is an urgent need to provide an economical outbound call management apparatus and procedure accessible to wide spectrum of those who use telecommunications services.

SUMMARY

The need identified above is met by an apparatus and procedure involving an outbound call management system which is contained in a public switched telephone network. Outbound call management services may thus be provided to any subscriber to the network without the necessity of that subscriber purchasing any expensive hardware and software and without the necessity of that subscriber paying the costs of a special service provider.

In one example of the invention, a public switched telephone network comprises one or more network nodes for connecting one or more network subscribers to one or more other network subscribers. The public switched telephone network has an outbound call management system which is an integral part of the network connected to or otherwise a part of at least one of the network nodes. The outbound call management system provides outbound call management services to selected ones of the subscribers. The outbound call management system is responsive to signals from those selected subscribers sent through one or more of the nodes in the network. Illustrative signals from subscribers may include those signals which program the outbound call management system to schedule and define predetermined calling programs to be executed by the system.

DETAILED DESCRIPTION

Figure 1:
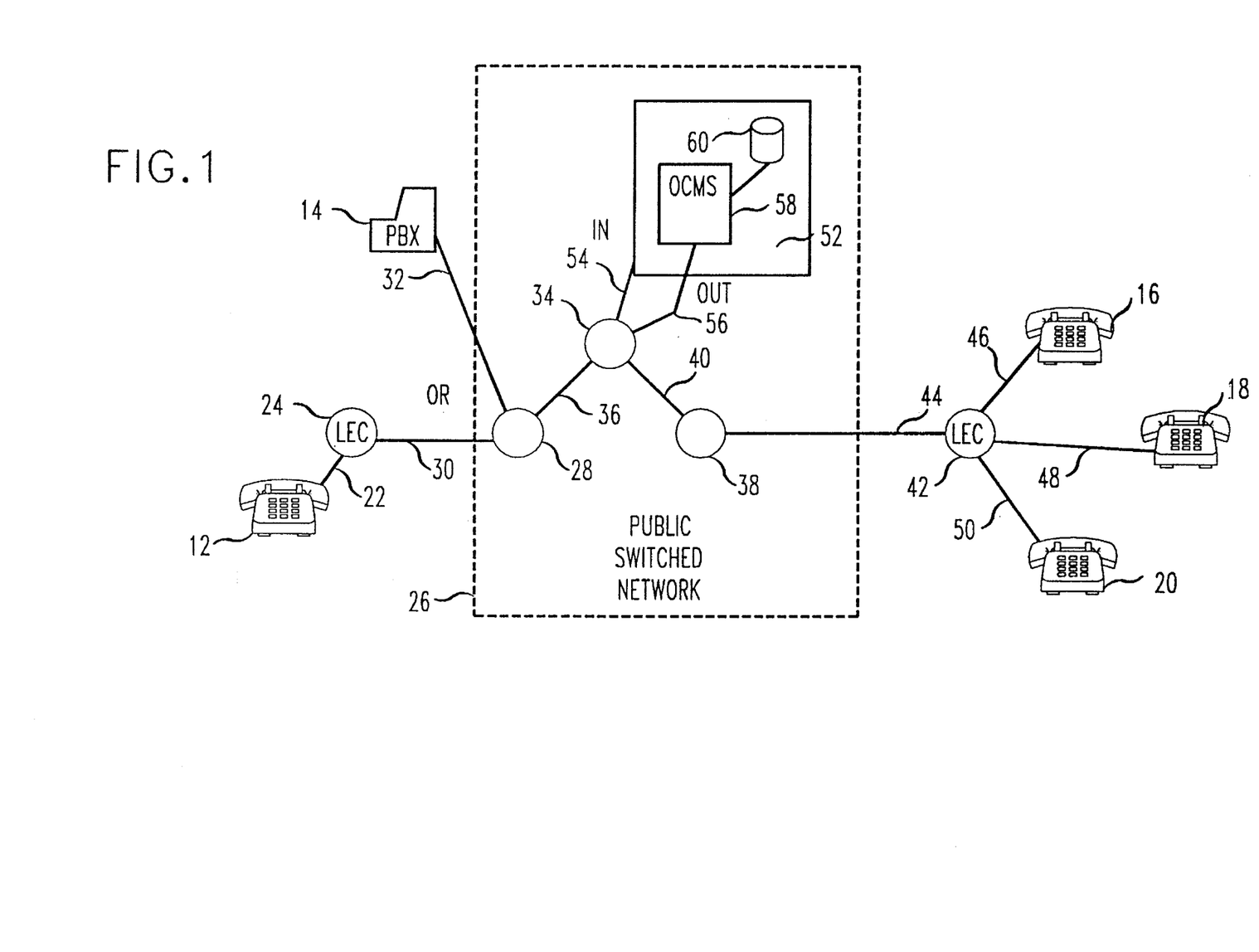
FIG. 1 illustrates an example of a public switched telephone network architecture having an outbound call management system in accordance with the principles of this invention.

FIG. 1 shows an example of a public switched telephone network architecture in accordance with the principles of this invention. The network serves to provide telecommunication services to a number of subscribers, for example, subscribers designated with reference numerals 12, 14, 16, 18, and 20 in FIG. 1. In the example shown in FIG. 1, the public switched telephone network architecture actually comprises a plurality of separate public switched telephone networks. Specifically, a subscriber such as a subscriber 12 in FIG. 1 is connected via a subscriber line 22 to a public switched telephone network 24 operated by a local exchange carrier (LEC) which provides local telephone service to the subscriber 12 and access to long distance networks. Although not shown specifically in FIG. 1, the public switched telephone network 24 of the local exchange carrier may comprise one or more network nodes and associated trunking and subscriber lines connected to a plurality of subscribers like subscriber 12. The equipment of the local exchange carrier is connected to another public switched telephone network 26 which may be operated by a long distance interexchange carder such as AT&T. The network 26 comprises a network node 28 which is connected to the network 24 of the local exchange carder via one or more trunks schematically represented by a line 30 in FIG. 1. The network node 28 may also be directly connected to certain subscribers such as subscriber 14 via one or more trunks schematically represented by a line 32 in FIG. 1. The network node 28 is connected to another network node 34 via one or more trunks 36. Network node 34, in turn, is connected to a third network node 38 via one or more trunks 40. The network node 38 may be connected to another public switched telephone network 42 via one or more trunks 44. The public switched telephone network 42 illustratively comprises another local telephone network operated by a local exchange carder (LEC) which provides local telephone service to the subscribers 16, 18, and 20 connected to the network 42 by subscriber lines 46, 48, and 50, respectively.

The local exchange carder may provide its subscribers with access to a long distance network such as network 26 in FIG. 1 via the connection represented by line 44 in FIG. 1.

The public switched telephone network 26 illustrated in the example of FIG. 1 includes a network based outbound call management system 52 which is connected to one of the network nodes 34 in the public switched telephone network 26. The connection between the outbound call management system 52 and the network node 34 comprises one or more input trunks 54 which receive signals from the rest of the public switched telephone network 26 and one or more output trunks 56 by which the outbound call management system 52 directs signals into the rest of the public switched telephone network 26. The input trunks 54 and output trunks 56 are sized and configured to handle the amount of communications traffic expected to occur between the outbound call management system 52 and the rest of the public switched telephone network 26. For example, the capacity of the trunking between the outbound call management system 52 and the rest of the network 26 may be the same as or similar to the capacity of the trunking between two of the nodes in the network 26. As is described in detail below, the outbound call management system 52 advantageously permits any subscriber connected to the public switched telephone networks shown in FIG. 1 to obtain outbound call management services without the necessity of obtaining expensive outbound call management equipment to be added to their private telecommunication systems and without the necessity of obtaining the services of a special service bureau in addition to the services of a telephone company. The invention thus advantageously avoids the need for significant amounts of special customer premises equipment (CPE) to accomplish outbound call management functions.

The outbound call management system comprises two main components, a processor 58 which interacts with the rest of the public switched telephone network to provide outbound call management services to subscribers connected to the network and a data base 60 connected to the processor 58 which contains information about the nature of the outbound call management programs which are to be executed by the processor 58.

The network nodes 28, 34, and 38 may be telephone switching systems located in central offices, such as AT&T's 4ESS™ central office switches or similar circuitry. Although FIG. 1 illustrates only one outbound call management system 52 connected to one of the network nodes 34 in the public switched telephone network 26, there may be a corresponding outbound call management system connected to any of the network nodes in the network 26. In addition, there may be one or more network based outbound call management systems attached to one or more of the nodes found in the public switched telephone networks 24 and 42. These outbound call management systems can be used to provide outbound call management services to local calling areas via the local network or to other calling areas via the connections between the local telephone networks and a long distance network like network 26 in FIG. 1. In the case of local area public switched telephone network having outbound call management capability, the network nodes to which outbound call management systems are connected may be central office switching systems customarily used in public switched telephone networks operated by local exchange carders, such as AT&T 5ESS™ central office switches and the like.

Although FIG. 1 shows that the network based outbound call management system 52 is a physically separate piece of equipment which is trunked to a network node, some or all of the system 52 may also be an integral part of the node to which it is connected. For example, some or all of the system 52 may comprise software located in computer circuitry already existing in the node to which the system is connected.

Figure 2:
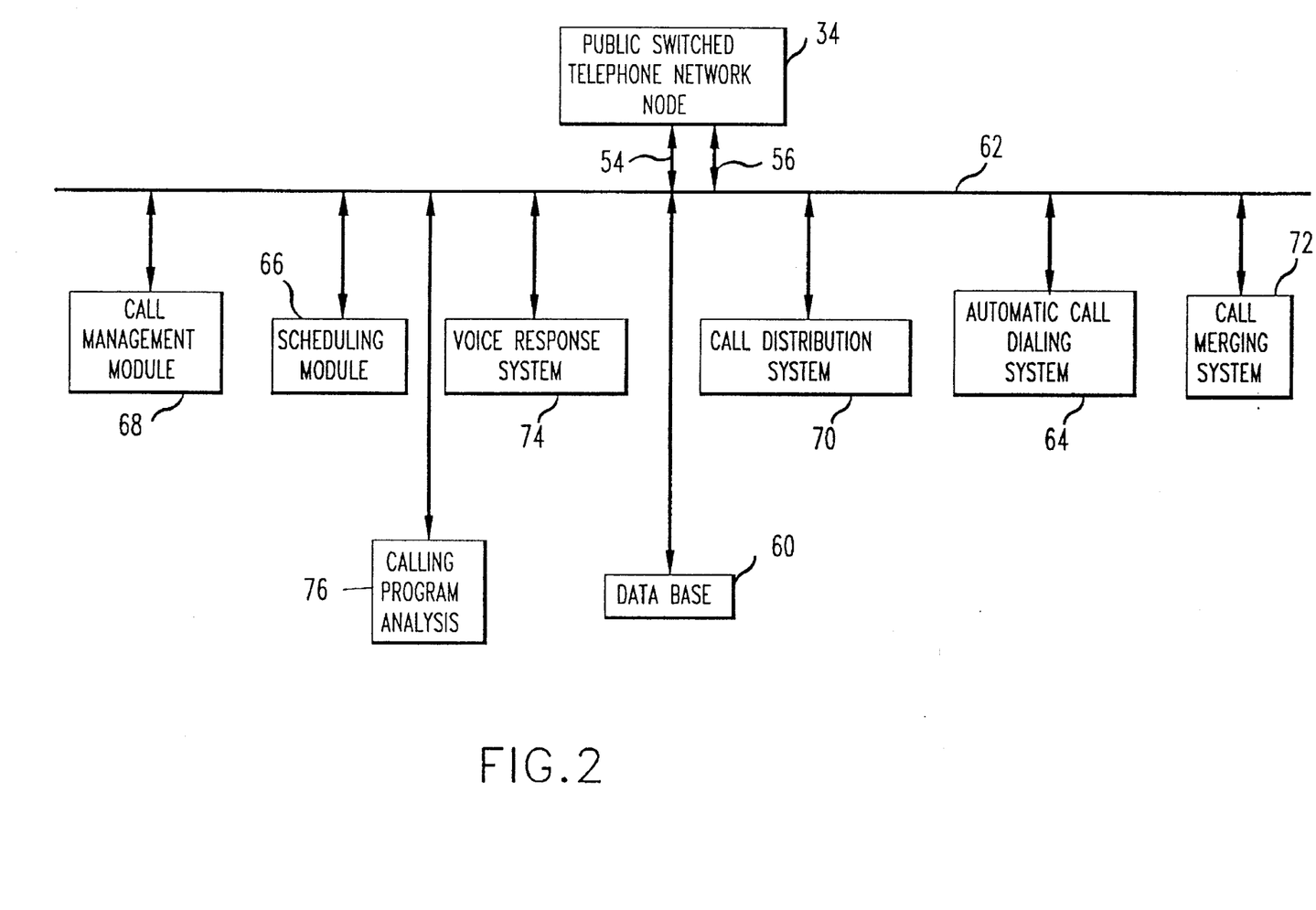
FIG. 2 is a detailed block diagram illustrating the components of the network based outbound call management system shown in FIG. 1.

FIG. 2 is a detailed block diagram of the systems in the network based outbound call management system shown in FIG. 1. As described in connection with the description of FIG. 1, the outbound call management system is connected to a network node 34 through an input trunk 54 and an output trunk 56. A pathway or link 62 receives signals from the network node 34 and directs those received signals to appropriate systems in the outbound call management system 52. The pathway 62 also receives output signals from each system in the outbound call management system 52 and directs those received signals to the network node 34 or to other systems in the outbound call management system, as appropriate.

The outbound call management system 52 comprises an automatic call dialing system 64 which automatically dials into the rest of the public switched telephone network a number of predetermined phone numbers selected by one or more network subscribers who are users of the outbound call management services provided by the network. The identity of the phone numbers is stored in the database 60 in the outbound call management system 52 and represent one or more dialing programs. The time at which the calls are to be placed by the automatic call dialing system is communicated to the system 52 by the user of network based outbound call management services through any telephone instrument or other input mechanism connected to the network. The user is permitted to call the outbound call management system 52 through the network and communicate with a scheduling module 66 which keeps track of, and manages records relating to, the reserved and unreserved capacity of the outbound call management system. The scheduling module 66 also receives appropriate commands from the user signifying the time period or time periods during which the user desires the outbound call management system to execute the user's outbound call management dialing programs. If the requested dialing programs are able to be accommodated by the unreserved capacity of the outbound call management system, the scheduling module 66 makes an appropriate reservation and notifies the user of the successful reservation. If not, the scheduling module 66 causes the system 52 to so notify the user. When the outbound call management system 52 executes such a dialing program, the automatic call dialing system 64 dials in sequence each telephone number identified by the user as part of the calling program stored in the database 60. A call management module 68 monitors the attempted telephone calls made by the automatic call dialing system 64 and directs the automatic call dialing system 64 to follow predetermined strategies in response to the behavior of the public switched telephone network as a result of the attempted telephone calls. If the automatic call dialing system is successful in completing an attempted telephone call specified by the dialing program, then a call distribution system 70 follows a predetermined program of specifying and selecting an agent or attendant of the user who will handle the completed telephone call. A call merging system 72 then is responsive to the selection made by the call distribution system 70 to connect the selected agent with the party who answered the successfully completed telephone call made by the automatic call dialing system 64. The agent then communicates with the connected party in accordance with the desires of the outbound call management system user. The agent may engage in telemarketing activities, survey taking, and bill collection, as well as any other activities for which outbound call management services may be used.

If the telephone call placed on the network by the automatic call dialing system 64 is not answered or a busy signal is detected, then the call management module 68 is responsive to this condition and determines how these types of events are treated in accordance with the wishes of the outbound call management user, as programmed by the user in the system 52. For example, the call management module 68 may direct the automatic call dialing system 64 to drop the phone number, and make no further attempts to complete the telephone call, or the call management module 68 may direct the automatic call dialing system 64 to place the telephone number which was unsuccessfully dialed in a predetermined location in a queue which makes up the list of telephone numbers yet to be dialed in the user's dialing program. For example, the call management module 68 may direct the telephone number defining the unsuccessful call to be placed at the end of the dialing program so that a further attempt can be made when the other phone numbers in the dialing program have been called.

The network based outbound call management system 52 also comprises a voice response system 74 which may be an AT&T Conversant™ type voice response system which receives information from a user wishing to employ outbound call management services. The voice response system 74 also communicates information to a user of network outbound call management services. The voice response system 74 may instruct the user as to how to schedule the performance of outbound call management services on the network. It may also direct the user as to how to download the telephone numbers which make up a desired dialing program loaded into the database 60. The voice response system 74 may also direct the user as to how to download the telephone numbers of the agents to whom it is desired to connect successfully completed telephone calls made in accordance with the dialing program. The voice response system may be responsive to actual voice commands from the user or to dual tone multifrequency commands keyed into the network by the user via a Touch Tone™ type or other similar telephone instrument. The commands are then stored in the database 60 for execution in accordance with reservations made by the user via the scheduling module 66.

The network based outbound call management system 52 also comprises a calling program analysis module 76 which monitors predetermined aspects of calling programs as they are executed. The analysis module 76 can provide certain predetermined statistical information about those calls. For example, the analysis module 76 can provide a user of outbound call management services with information about the successful completion rate of the telephone calls made in accordance with the user's predetermined dialing program. The analysis module 76 may also provide information about which of the user's agents were used in the course of the program and how efficiently they were used in terms of the percentage of time they were actually handling phone calls completed by the outbound call management system 52. The analysis module 76 may also detect the duration of each call. All of the data generated by the analysis module 76 may be stored in the database 60 and later down loaded to the user at his request via a phone call the user makes to the system 52 or automatically to a telephone number earlier specified by the user and stored in the system 52.

Figure 3:
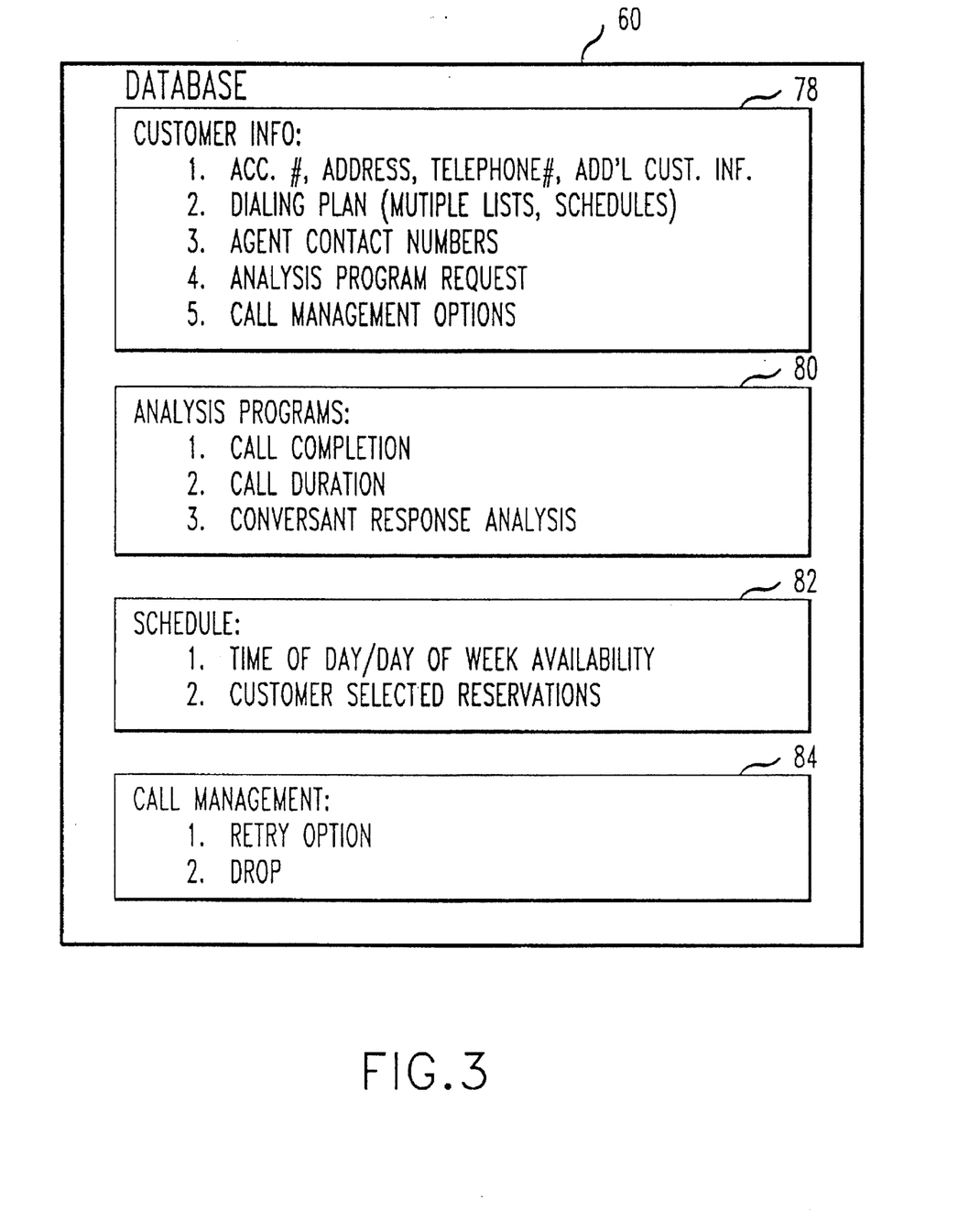
FIG. 3 illustrates the structure of the data base shown in FIGS. 1 and 2.

FIG. 3 is a detailed diagram of the structure of the database 60 which illustrates the nature of the information stored in the database 60. As shown in FIG. 3, the database 60 contains a block 78 which contains certain information about each network customer who subscribes to and uses the outbound call management services in accordance with the principles of this invention. The customer information may include an account number uniquely identifying each customer. The customer information may also include an address, telephone number, and other information useful in identifying and communicating with each customer and in segregating the information in the database 60. The block 78 also contains information entered by the customer through an appropriate phone call placed into the telephone network and the call management system 52 about the dialing programs which the customer desires the outbound call management system 52 to execute on the customers behalf. The dialing plan may involve one or more lists of telephone numbers which a customer would like the outbound call management system 52 to make. The block 78 also includes scheduling information identifying the time or times at which the user wishes to have the outbound call management system dial the phone numbers in each list stored in block 78. The block 78 also contains information specified by each user relating to the telephone numbers of the user's agents or attendants who are to handle the telephone calls completed by the outbound call management system 52. The block 78 also contains information about selected analysis programs to be performed by the outbound call management system for each of the customer's dialing plans. The block 78 finally contains information about each customer's desires with respect to call management options, namely, the outbound call management system's treatment of answered, busy, and no answer phone calls.

The database 60 also contains a block 80 which contains information about the results of the execution of the analysis programs requested by the customer. The database may contain, for example, information about call completion, call duration, and analysis of responses made by the voice response unit 74.

A block 82 in the database 60 contains information about scheduling. Specifically, the block 82 may contain information about the times at which the outbound call management system is to effectuate outbound call management services, the amount of unused capacity, and the unavailable capacity which has been already reserved by users of the outbound call management system 52.

Finally, the database 60 comprises of block 84 which contains information about various call management options. Specifically, the block 84 may contain data relating to the strategies used in retrying unsuccessfully completed telephone calls or dropping a telephone number relating to an unsuccessfully completed telephone call.

Figure 4:
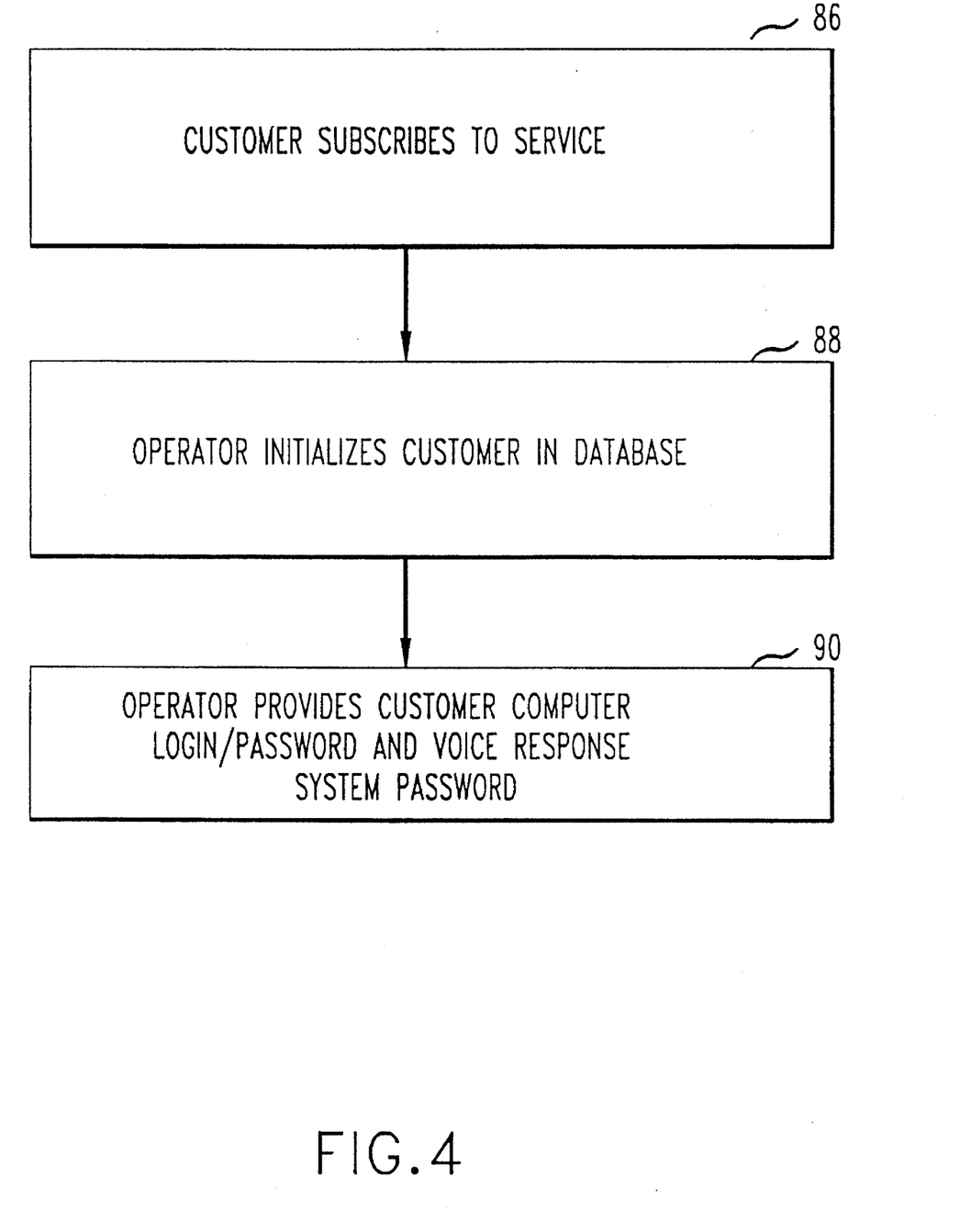
FIGS. 4 to 6 are flow charts illustrating the operation of the network based outbound call management system of FIGS. 1 to 3.

FIG. 4 is a flow chart describing the steps by which any subscriber to a public switched telephone network in accordance with the principles of this invention can become a customer or user of the network based outbound call management services. In block 86, a network subscriber wishing to use the outbound call management services of a public switched telephone network in accordance with this invention first calls an appropriate operator employed by the public switched telephone network and notifies that operator that he or she wishes to use the outbound call management services of the network. In block 88, the operator takes appropriate information from the proposed user and initializes that user in the database 60 by entering the information therein. The operator then provides the customer, as indicated in block 90, with a computer login and any associated passwords and a voice response system password which will be used by the customer to obtain desired outbound call management services.

Figure 5:
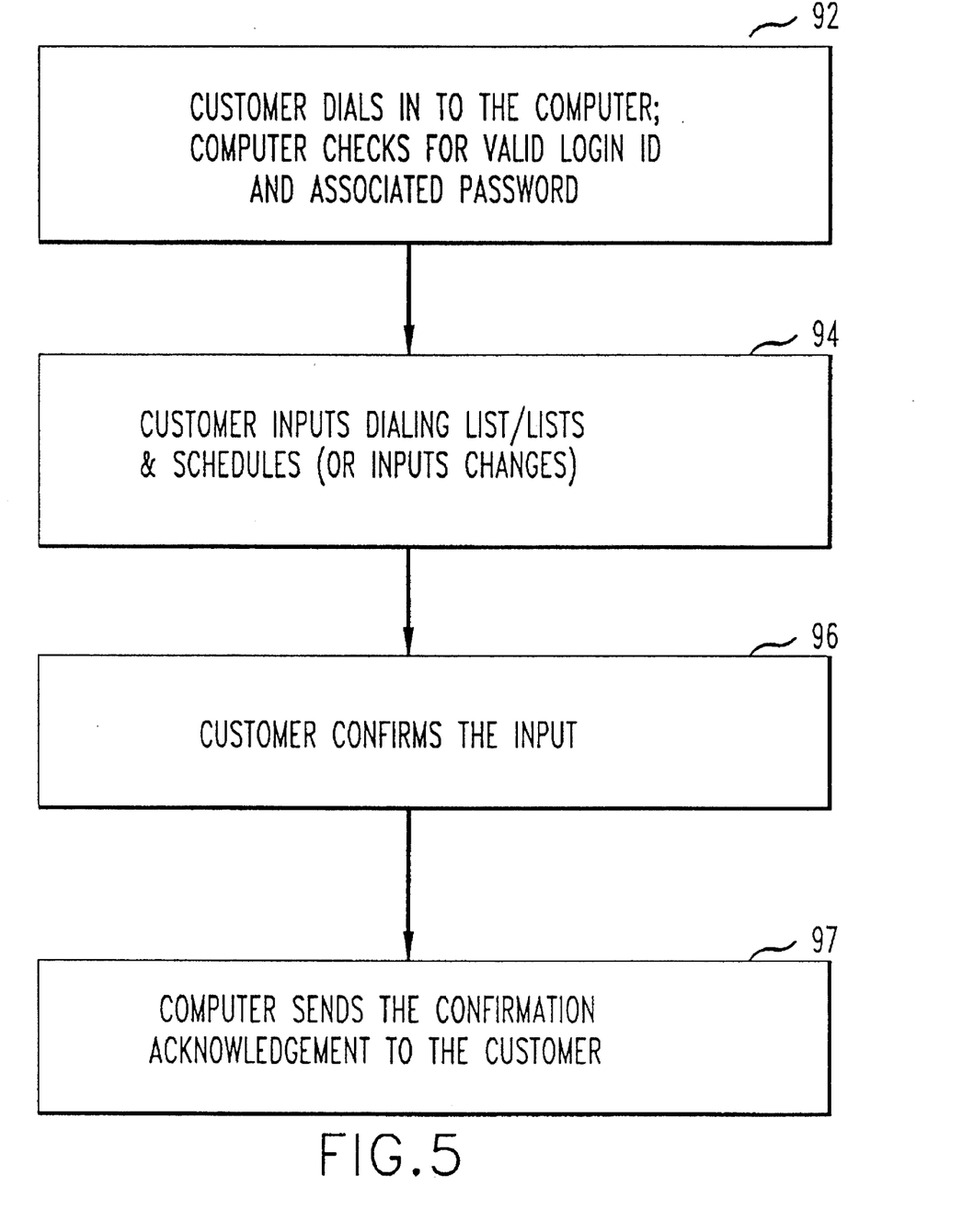

FIG. 5 is a flow chart illustrating the steps undertaken by a user of network based outbound call management services in accordance with the principles of this invention to program the outbound call management system 52 to perform desired operations. In block 92, a user may manually dial the outbound call management system 52 through the public switched telephone network from any user's telephone. Alternatively, a computer controlled by the user may dial into a system in the outbound call management system 52 which receives and handles computer generated input signals. Also in block 92, a computer in the outbound call management system 52 checks for a valid login ID and any associated passwords received from the user or the user's computer. In one embodiment, the voice response unit 74 in the outbound call management system 52 responds to the phone call placed by the user and provides appropriate instructions for the user to program the system in accordance with his or her desired outbound call management needs. The user responds to the instructions produced by the voice response unit 74 by inputting either voice commands or dual tone multiple frequency commands (DTMF commands) into the network. In block 94, the user inputs phone numbers comprising one or more dialing lists which are to be called by the automatic call dialing system 64 in the management system 52. If the user already has one or more dialing lists input to the system, he or she may change those lists at block 94 in FIG. 5. The schedule on which the dialing list is to be called is also input by the user in response to a prompt from the voice response system 74. The user may be asked to confirm the accuracy of the input in block 96. In block 97, the computer sends a confirmation acknowledgment to the user. In another embodiment, a user's computer may input, in block 94, information about desired dialing lists, schedules, and changes to existing dialing lists and schedules. (Large dialing lists and complicated outbound call management procedures advantageously may be programmed into the system 52 via computer input to the telephone network or, in some cases, may be made via a transmission of hardcopy directly to the telephone network services provider.)

Figure 6:
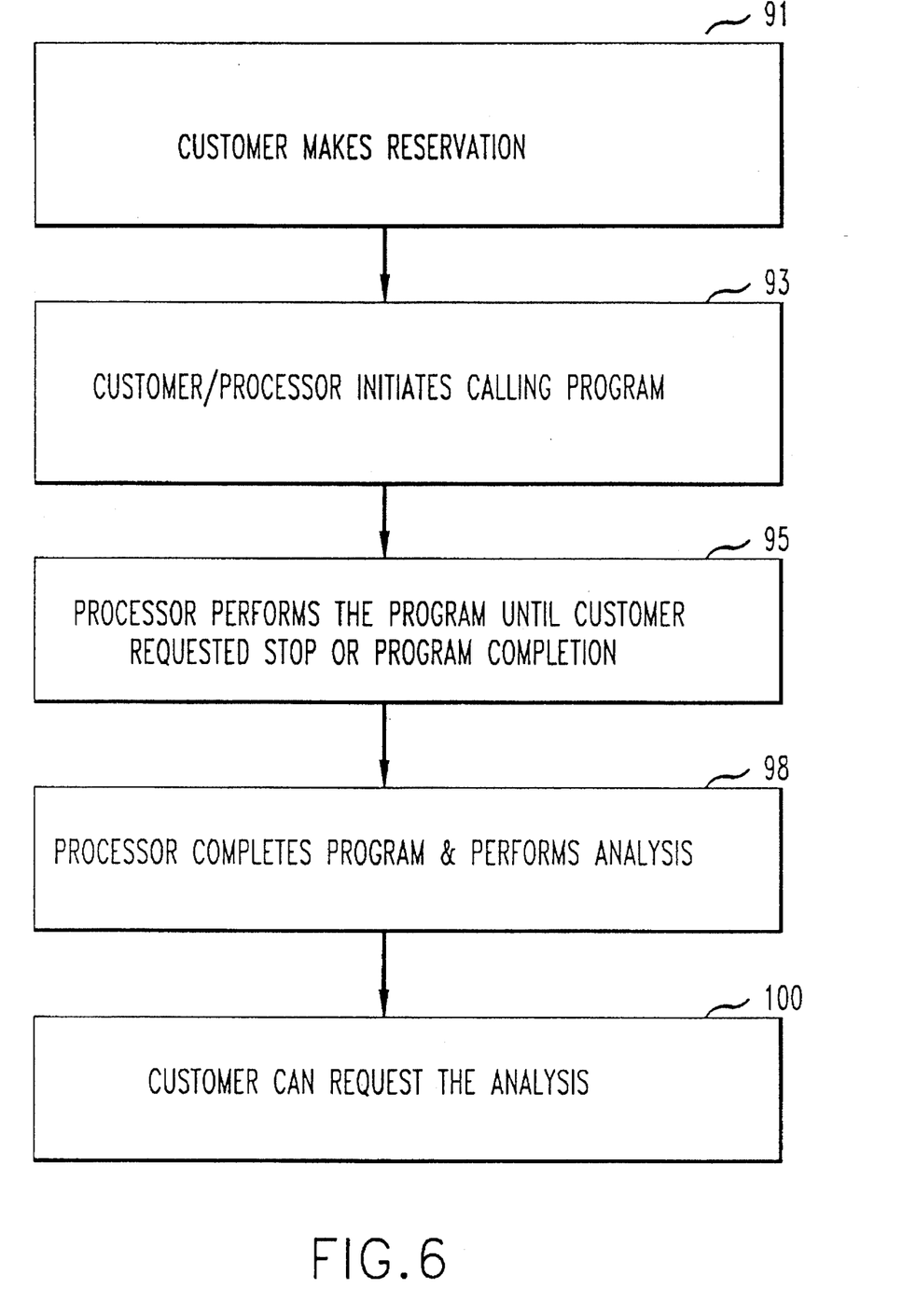

FIG. 6 is a flow chart representing the call flow for an example of a network based outbound call management system in accordance with the principles of this invention. The call flow involves a customer making a reservation of outbound call management capacity in block 91 involving provision of a list of telephone numbers to be dialed by the system and a schedule for dialing those numbers. The customer may dial a predetermined access number which will cause the customer to be connected to the outbound call management system 52. The caller will interact with the system 52 via voice or DTMF commands and enter the appropriate information for his or her calling program. The customer may cause the processor 58 to initiate the calling program via a phone call to the system 52 or the processor 58 may automatically cause the customer's calling program to be initiated at the designated time specified in the reservation, as indicated in block 93. The processor 58 then performs the desired calling program in accordance with the specified dialing list until the program is completed or until the customer requests that the program be interrupted, as shown in block 95. During the course of executing the calling program, the customer's agents or attendants perform their scripts as successful calls are connected back to them by the processor 58. In the alternative, the customer may provide a voice polling system instead of live agents or attendants. In this system, called parties may interact with a computer generated voice which can be responded to via DTMF or voice commands entered by the called party into a telephone instrument. The processor 58 performs any desired analysis in block 98 at the completion of the program or when the program is interrupted by the customer. The analysis produced in block 98 can then be requested by the customer in block 100.

We claim:

1. A method of providing outbound call management services in a telecommunications network, comprising the steps of:

storing in the telecommunications network a calling program received from a subscriber of outbound call management services provided by the telecommunications network, a calling program comprising a first list of one or more telephone numbers to be automatically dialed by the telecommunications network and a second list of one or more telephone numbers to which successfully completed automatically dialed telephone calls are to be connected by the telecommunications network;

automatically making a first telephone call to one of the telephone numbers in the first list;

automatically making a second telephone call to one of the telephone numbers in the second list; and merging the first and second telephone calls.

2. A method of providing outbound call management services in a telecommunications network, comprising the steps of:

storing in the telecommunications network one or more calling programs received from a subscriber of outbound call management services in the telecommunications network comprising a first list of telephone numbers to be automatically dialed by the telecommunications network and a second list of telephone numbers to which successfully completed automatically dialed telephone calls are to be connected by the telecommunications network;

automatically making a first telephone call by dialing one or more of the telephone numbers in the first list at one or more times preselected by the subscriber;

automatically making a second telephone call to one of the telephone numbers in the second list in response to a successful completion of the first telephone call; and merging the first and second telephone calls.

3. A method of providing outbound call management services in a telecommunications network, comprising the steps of:

receiving a telephone call in the network from an outbound call management services subscriber to an outbound call management system in the network;

receiving an identification from the outbound call management services subscriber during the telephone call and validating that subscriber in light of the received identification;

connecting the subscriber during the telephone call to an outbound call management system in the network in response to validation of the subscriber;

receiving from the subscriber, after connection of the subscriber to the outbound call management system during the telephone call, one or more calling programs comprising scheduling information, a first list of one or more telephone numbers to be automatically dialed by the network, and a second list of one or more telephone numbers to which successfully completed automatically dialed telephone calls are to be connected by the network;

storing the one or more calling programs in a database in the network;

executing one or more of the calling programs by the network at a predetermined time in accordance with the scheduling information by automatically making a first telephone call to one of the telephone numbers in the first list, automatically making a second telephone call to one of the telephone numbers in the second list, and merging the first and second telephone calls.

* * * * *